United States Patent [19]

Asterlin

[11] Patent Number: 4,669,167
[45] Date of Patent: Jun. 2, 1987

[54] METHOD OF REMOVING FILTER BAG

[75] Inventor: Gunther E. Asterlin, South Bend, Ind.

[73] Assignee: Filter Specialists, Inc., Michigan City, Ind.

[21] Appl. No.: 792,487

[22] Filed: Oct. 29, 1985

[51] Int. Cl.$^4$ .............................................. B23P 19/00
[52] U.S. Cl. .................... 29/426.6; 29/451; 210/232; 210/238
[58] Field of Search ............... 29/426.6, 451; 210/238, 210/232, 471, 470, 495, 480

[56] References Cited

U.S. PATENT DOCUMENTS

| | | | |
|---|---|---|---|
| 531,701 | 1/1895 | Smith | 29/426.6 X |
| 1,972,264 | 9/1934 | Hirschorn | 210/471 X |
| 3,780,871 | 12/1973 | Hicks et al. | 210/471 |
| 3,941,697 | 3/1976 | Johnson | 210/470 X |
| 4,240,192 | 12/1980 | Davis | 29/426.6 |
| 4,373,258 | 2/1983 | Hutchins | 29/426.6 X |
| 4,419,240 | 12/1983 | Rosaen | 210/470 X |
| 4,490,253 | 12/1984 | Tafara | 210/470 X |
| 4,552,661 | 11/1985 | Morgan | 210/232 |

*Primary Examiner*—Charlie T. Moon
*Attorney, Agent, or Firm*—James D. Hall

[57] ABSTRACT

A method of removing a self-retaining filter bag from a filter housing by flexing the upper margin of the bag to free the bag from the housing and then withdrawing the bag from the housing.

1 Claim, 7 Drawing Figures

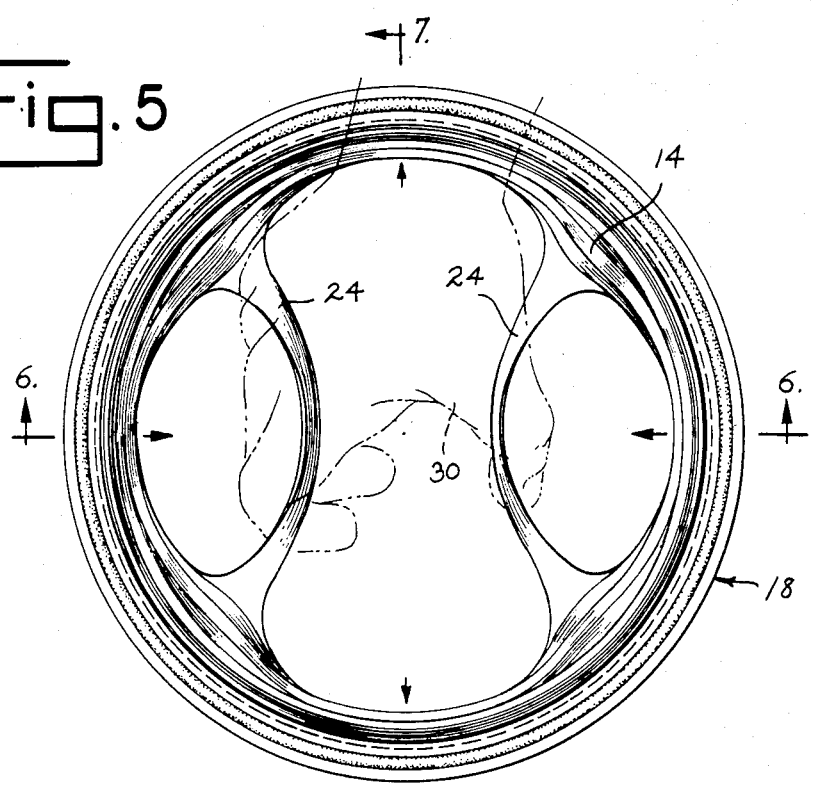
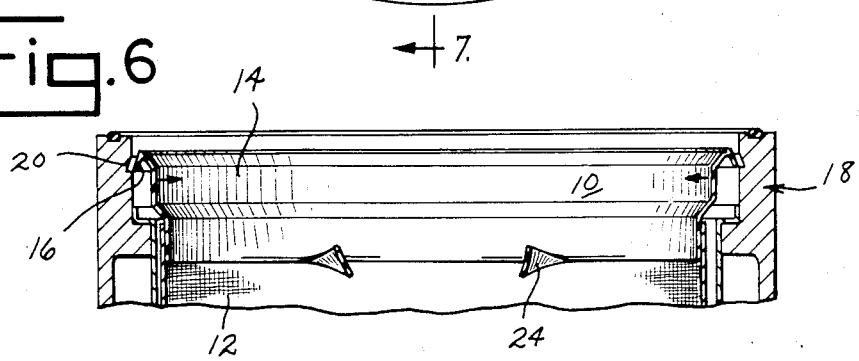
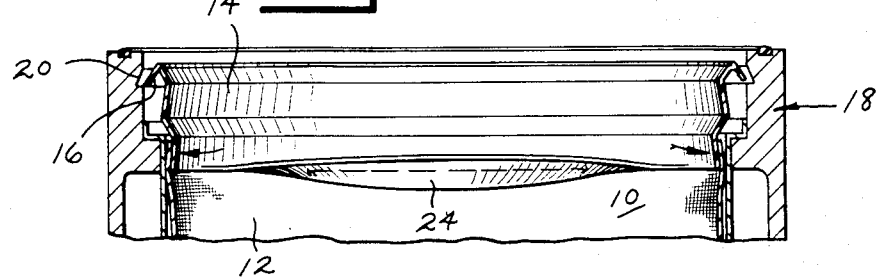

METHOD OF REMOVING FILTER BAG

SUMMARY OF THE INVENTION

This invention relates to a method of removing a self-retained filter bag from a filter housing.

In the operation of fluid filters, one of the most critical features is the tightness of the seal formed between the filter housing and the opening-defining upper margin of the bag. This seal is necessary to ensure that all of the fluid which enters the chamber passes through the filter bag.

Over the years, many different designs have been utilized in an attempt to obtain an effective seal. Usually, the bag is held in place by an overlying plate or cover, as shown in U.S. Pat. Nos. 3,503,516, 4,022,693, and 4,259,188, or by a bag and housing engagement as shown in U.S. Pat. Nos. 4,133,769 and 4,204,966. In general, the filter bag includes a side wall of fluid pervious material and a ring defining an opening into the bag formed of flexible, shape-retaining fluid impervious material. The ring to which this invention applies is very similar to that which is described in U.S. Pat. No. 4,259,188. However, there has been an improvement made in the self-retaining feature of the bag engagement with the filter housing, such an improvement is described in detail in co-pending application Ser. No. 497,426.

In normal usage, the filter bag is removed from the filter housing, which may or may not include a reticulated basket, when it becomes necessary to clean or change bags during use. This particular filter bag, with an external lip formed to interlock with the filter housing about the housing opening, is so efficient in design that it is extremely difficult for a user to remove.

The filter bag is provided at its flexible ring with two opposed handles by which, formerly, the filter user would grasp by both hands and pull upwardly to withdraw the bag from the filter housing. In the method of this invention, the user grasps both handles with one hand and squeezes to flex the bag ring which frees the bag from the filter housing.

Accordingly, it is an object of this invention to provide a method of quickly removing a self-retained filter bag from a filter housing.

BRIEF DESCRIPTION OF THE DRAWINGS

FIG. 5 is a plan view of the filter with the hand of the user, shown in broken line form, squeezing the filter bag handles.

FIG. 6 is a fragmentary sectional view taken along line 6—6 of FIG. 5.

FIG. 7 is a fragmentary sectional view taken above line 7—7 of FIG. 5.

DESCRIPTION OF THE PREFERRED EMBODIMENTS

Figure 1:
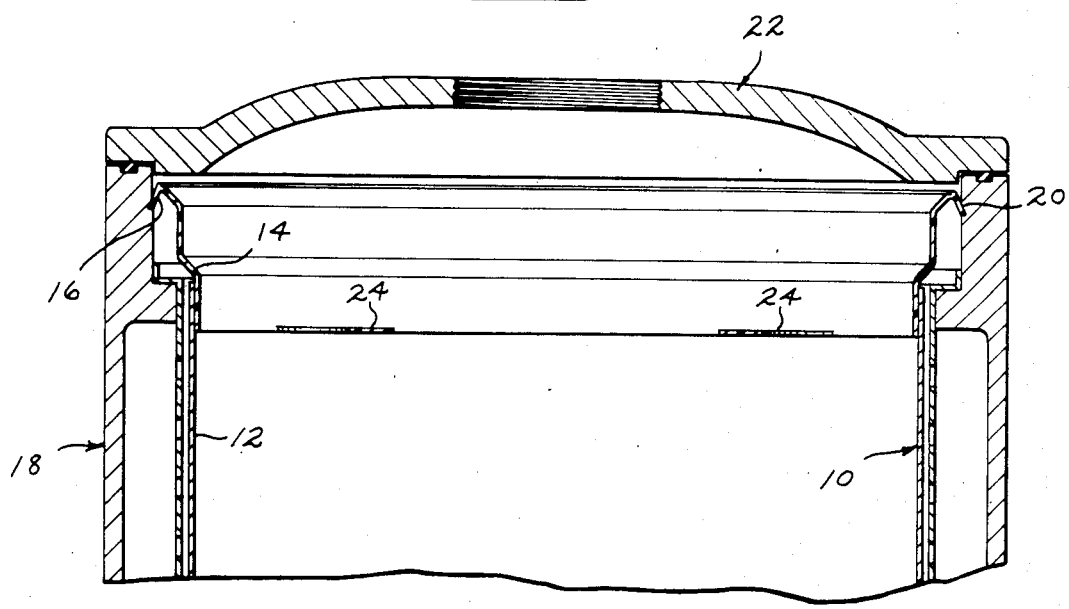
FIG. 1 is a partial sectional view of a filter showing the filter bag interlocked with the filter housing.
Figure 2:
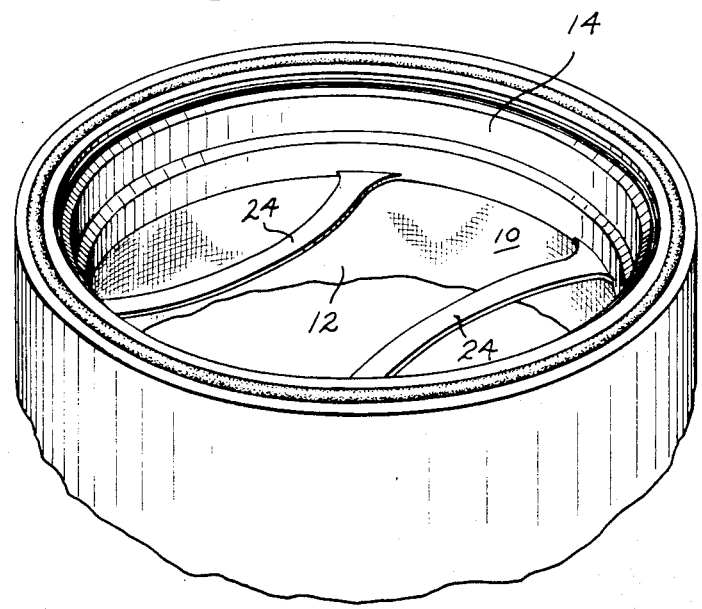
FIG. 2 is a fragmentary perspective view of the filter with its top removed.

The filter bag 10 includes a flexible, normally cloth-like liquid pervious material 12 and a flexible shape-retaining liquid impervious upper marginal portion or ring 14 which terminates in an annular down-turned lip 16. When the bag is inserted into the filter housing 18, the lip is flexed or snap-fitted into an annular channel 20 in the housing at its opening. It has been found that this design forms a secure seal between the bag and the housing independent of the housing cover 22.

Indeed, the seal is so secure that it is extremely difficult for a user to remove this bag by only an upward pull upon bag handles 24. Handles 24 are of generally semi-circular form and are attached to the bag ring 14 at opposite sides of the ring.

Figure 3:
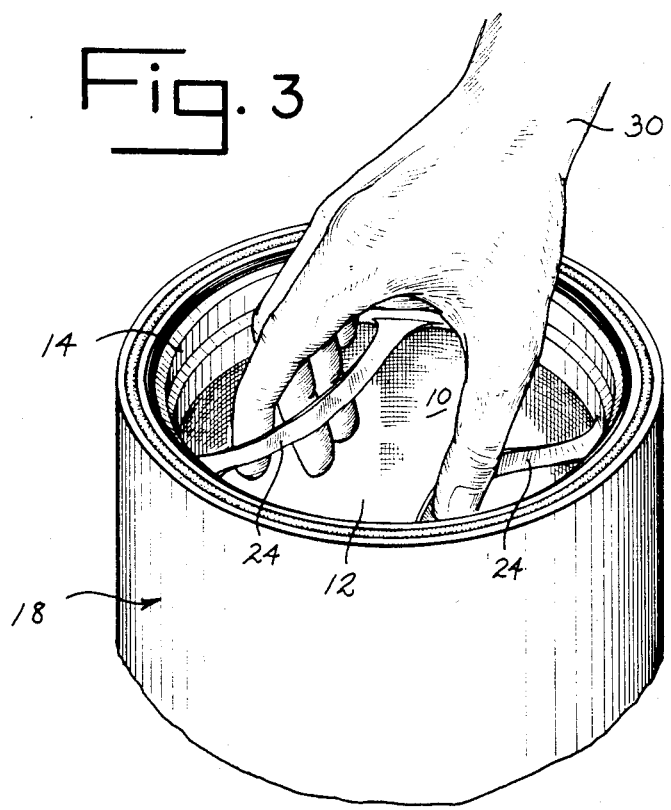
FIG. 3 is a perspective view showing a user grasping the filter bag handles in preparation to flex the bag ring for disengaging the bag from the filter housing.

To remove bag 10, the user grasps handles 24 with one hand 30 (see FIG. 3) and squeezes to urge the handles toward each other (see FIG. 5).

Figure 4:
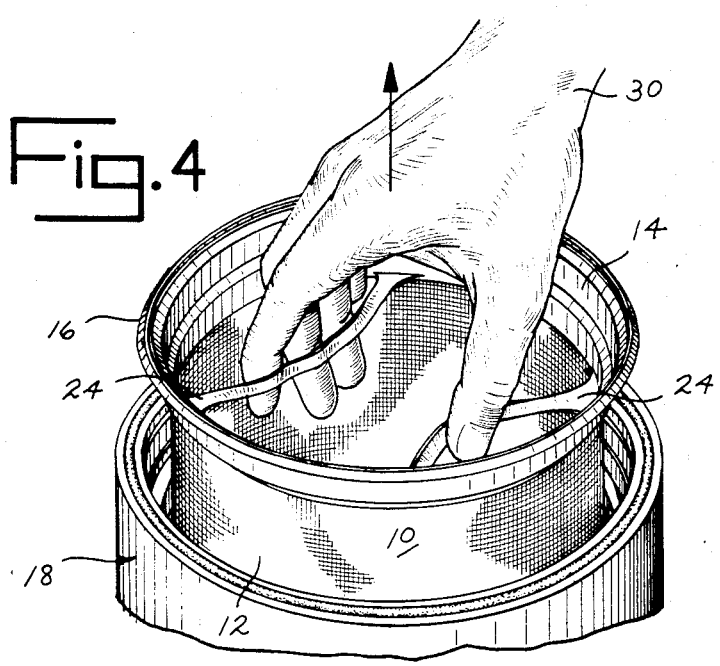
FIG. 4 is a perspective view showing the filter bag being lifted from the filter housing.

When handles 24 are squeezed toward each other, the bag ring 14 is flexed inwardly at the handles to cause bag ring lip 16 to be flexed out of channel 20 in the housing such as seen in FIGS. 6 and 7. With the bag lip 16 so freed from housing channel 20, the handles 24 now serve to lift and remove the filter bag 10 from the housing as seen in FIG. 4.

I claim:

1. A method for removing a filter bag from a filter housing, said bag including a flexible shape-retaining upper marginal ring portion and a filtering portion depending from said marginal portion, opposed handles connected to said marginal ring portion, said housing having an annular retaining part with said marginal ring portion being restrictively secured within said housing by said retaining part, said method of removing said bag from said housing includes the following steps:
   (a) Grasping both said handles in one hand;
   (b) Urging said handles towards each other causing said marginal ring portion to flex at spaced locations thereby freeing a substantial portion of the marginal ring portion from said housing retaining part; and
   (c) Withdrawing said bag out of said housing while still grasping said handles.

* * * * *